(12) United States Patent
Fauconnet et al.

(10) Patent No.: US 11,040,857 B2
(45) Date of Patent: Jun. 22, 2021

(54) DOOR MOTOR BRAKE

(71) Applicant: Otis Elevator Company, Farmington, CT (US)

(72) Inventors: Aurélien Fauconnet, Gien (FR); Gérard Sirigu, Saint Benoit (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 647 days.

(21) Appl. No.: 15/752,714

(22) PCT Filed: Aug. 14, 2015

(86) PCT No.: PCT/IB2015/001551
§ 371 (c)(1),
(2) Date: Feb. 14, 2018

(87) PCT Pub. No.: WO2017/029531
PCT Pub. Date: Feb. 23, 2017

(65) Prior Publication Data
US 2018/0244498 A1    Aug. 30, 2018

(51) Int. Cl.
*B66B 13/16* (2006.01)
*B66B 13/08* (2006.01)
*B66B 9/00* (2006.01)
*F16D 63/00* (2006.01)

(52) U.S. Cl.
CPC .............. *B66B 13/165* (2013.01); *B66B 9/00* (2013.01); *B66B 13/08* (2013.01); *F16D 63/006* (2013.01)

(58) Field of Classification Search
CPC ........ B66B 13/165; B66B 13/16; B66B 13/08
See application file for complete search history.

(56) References Cited

U.S. PATENT DOCUMENTS

| | | |
|---|---|---|
| 1,922,708 A | 8/1933 | Norton |
| 2,042,937 A | 6/1936 | Henricksen |
| 3,200,905 A | 8/1965 | Holdridge |
| 3,732,447 A | 5/1973 | Perhats |
| 4,410,067 A | 10/1983 | Leiner et al. |
| 4,510,405 A | 4/1985 | Carroll et al. |
| 5,196,656 A | 3/1993 | Mizuno et al. |

(Continued)

FOREIGN PATENT DOCUMENTS

| | | |
|---|---|---|
| CN | 201027473 Y | 2/2008 |
| CN | 104234575 A | 12/2014 |

(Continued)

OTHER PUBLICATIONS

English Machine Translation JP 2007-204242.*

(Continued)

*Primary Examiner* — Diem M Tran
(74) *Attorney, Agent, or Firm* — Cantor Colburn LLP

(57) ABSTRACT

An elevator system includes a hoistway; and an elevator car (12) disposed in and drivable along the hoistway, the elevator car including: an elevator car door (38); an elevator door motor (40) operably connected to the elevator car door to selectably open and close the elevator car door; and a door motor brake (52) disposed at the elevator car door and selectably engageable with the elevator door motor to prevent operation of the elevator door motor thus preventing undesired opening and/or closure of the elevator car door.

12 Claims, 4 Drawing Sheets

(56) References Cited

U.S. PATENT DOCUMENTS

| | | | |
|---|---|---|---|
| 5,655,627 A | | 8/1997 | Horne et al. |
| 5,671,829 A | | 9/1997 | Rivera |
| 6,094,867 A | | 8/2000 | Reddy |
| 7,537,091 B2 | | 5/2009 | Fargo |
| 9,695,015 B1 | * | 7/2017 | Marinelli .............. B66B 13/185 |
| 2008/0190151 A1 | | 8/2008 | Ritt et al. |
| 2012/0048657 A1 | * | 3/2012 | Christen .............. B66B 13/301 |
| | | | 187/330 |
| 2012/0324963 A1 | | 12/2012 | Parsadayan et al. |

FOREIGN PATENT DOCUMENTS

| | | | |
|---|---|---|---|
| EP | 0927697 A1 | | 7/1999 |
| EP | 1365095 A2 | | 11/2003 |
| EP | 3456909 A1 | * | 9/2017 |
| JP | 56132284 A | | 10/1981 |
| JP | 05162991 A | * | 6/1993 |
| JP | H05162991 A | | 6/1993 |
| JP | 2007204242 A | | 8/2007 |

OTHER PUBLICATIONS

Japanese Office Action for Japanese Application No. 2018-507491, dated Feb. 25, 2020, 3 pages.
International Search Report for International Application No. PCT/IB2015/001551; International Filing Date: Aug. 14, 2015; dated May 4, 2016; 6 Pages.
Written Opinion for Intenational Application No. PCT/IB2015/001551; International Filing Date: Aug. 14, 2015; dated May 4, 2016; 5 Pages.
Chinese Office Action Issued in CN Application No. 201580082506.4, dated Aug. 5, 2019, 6 Pages.
Japanese Office Action Issued in JP Application No. 2018-507491, dated Jul. 30, 2019, 4 Pages.

* cited by examiner

DOOR MOTOR BRAKE

CROSS REFERENCE TO RELATED APPLICATION

This application is a National Stage application of PCT/IB2015/001551, filed Aug. 14, 2015, the entire contents of which are hereby incorporated by reference.

BACKGROUND

The subject matter disclosed herein relates to elevator systems. More particularly, the present disclosure relates to devices limiting elevator car door opening.

In existing elevator systems, certain elevator cars may be equipped with deterrent devices to limit opening of the elevator car door when the elevator car is not in a door opening zone, such as at a landing floor of the elevator system. The typical deterrent device is a mechanical device, such as a cam and roller arrangement, that interacts with the elevator car door coupling, and physically prevents the coupling from releasing and allowing opening of the elevator car door when the elevator car is outside of the door opening zone.

New code requirements enacted by regulatory bodies will make preventing of elevator car door opening, such as with deterrent devices, mandatory, and will also establish a new opening limit of 50 mm, where the typical deterrent device such as described above only prevents the elevator car door from opening more than 100 mm. The typical deterrent device requires adjustment of the distance between the cam device and the door coupling once installed on the elevator car, and may require service and adjustment during the service life of the elevator car, especially due to the newly established 50 mm opening limit. This adjustment is not desirable since the location of the deterrent device on the outside of the elevator car conflicts with further manufacturer initiatives to reduce and/or eliminate maintenance activities that need to be performed from outside of the elevator car. As such, alternative deterrent devices are desired.

BRIEF SUMMARY

In an exemplary embodiment, an elevator system includes a hoistway; and an elevator car disposed in and drivable along the hoistway, the elevator car including: an elevator car door; an elevator door motor operably connected to the elevator car door to selectably open and close the elevator car door; and a door motor brake disposed at the elevator car door and selectably engageable with the elevator door motor to prevent operation of the elevator door motor thus preventing undesired opening and/or closure of the elevator car door.

In addition to one or more of the features described above, or as an alternative, further embodiments may include wherein the door motor brake is a mechanical stop engageable with the elevator door motor.

In addition to one or more of the features described above, or as an alternative, further embodiments may include wherein the elevator door motor includes a drive axle to urge operation of the elevator car door; and a braking disk connected to the drive axle, the door motor brake selectably engageable with the braking disk to prevent operation of the elevator door motor.

In addition to one or more of the features described above, or as an alternative, further embodiments may include one or more braking features in the braking disk, the door motor brake engageable with the braking disk through the one or more braking features.

In addition to one or more of the features described above, or as an alternative, further embodiments may include wherein the door motor brake comprises a movable pin selectably engageable with the elevator door motor.

In addition to one or more of the features described above, or as an alternative, further embodiments may include an electrical coil disposed at the pin to urge movement of the pin between an extended position in engagement with the elevator door motor and a retracted position out of engagement with the elevator door motor.

In addition to one or more of the features described above, or as an alternative, further embodiments may include wherein the application of an electrical current to the electrical coil urges the pin toward the retracted position.

In addition to one or more of the features described above, or as an alternative, further embodiments may include a biasing member to urge the pin into engagement with the elevator door motor.

In another exemplary embodiment, an elevator car door operating system includes an elevator door motor operably connectable to an elevator car door to selectably open and close the elevator car door; and a door motor brake disposed in proximity to the elevator door motor and selectably engageable with the elevator door motor to prevent operation of the elevator door motor thus preventing undesired opening and/or closure of the elevator car door.

In addition to one or more of the features described above, or as an alternative, further embodiments may include wherein the door motor brake is a mechanical stop engageable with the elevator door motor.

In addition to one or more of the features described above, or as an alternative, further embodiments may include wherein the elevator door motor includes a drive axle to urge operation of the elevator car door; and a braking disk connected to the drive axle, the door motor brake selectably engageable with the braking disk to prevent operation of the elevator door motor.

In addition to one or more of the features described above, or as an alternative, further embodiments may include one or more braking features in the braking disk, the door motor brake engageable with the braking disk through the one or more braking features.

In addition to one or more of the features described above, or as an alternative, further embodiments may include wherein the door motor brake comprises a movable pin selectably engageable with the elevator door motor.

In addition to one or more of the features described above, or as an alternative, further embodiments may include an electrical coil disposed at the pin to urge movement of the pin between an extended position in engagement with the elevator door motor and a retracted position out of engagement with the elevator door motor.

In addition to one or more of the features described above, or as an alternative, further embodiments may include wherein the application of an electrical current to the electrical coil urges the pin toward the retracted position.

In addition to one or more of the features described above, or as an alternative, further embodiments may include a biasing member to urge the pin into engagement with the elevator door motor.

These and other features of exemplary embodiments are disclosed herein.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
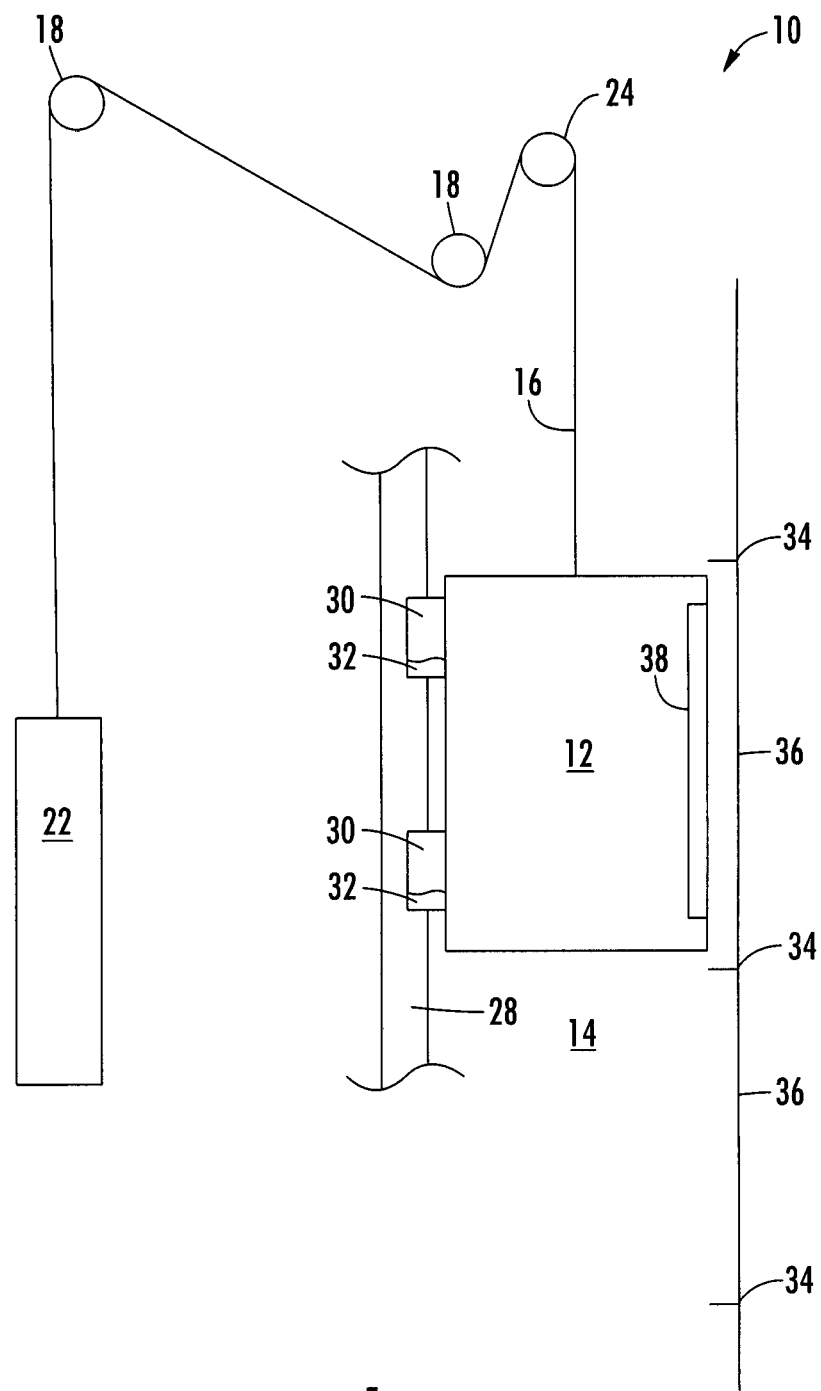
FIG. 1 is a schematic view of an embodiment of an elevator system.

Shown in FIG. 1 is a schematic of an exemplary elevator system 10. The elevator system 10 includes an elevator car 12 operatively suspended or supported in a hoistway 14 with one or more suspension members 16, such as ropes or belts. The one or more suspension members 16 interact with one or more sheaves 18 to be routed around various components of the elevator system 10. The one or more sheaves 18 could also be connected to a counterweight 22, which is used to help balance the elevator system 10 and reduce the difference in suspension member 16 tension on both sides of a traction sheave 24 during operation.

The elevator system 10 further includes one or more guide rails 28 to guide the elevator car 12 along the hoistway 14. The elevator car 12 includes one or more guide shoes or rollers 30 interactive with the guide rails 28 to guide the elevator car 12. The elevator car 12 also may include safeties 32 interactive with the guide rail 28 to slow and/or stop motion of the elevator car 12 under certain conditions, such as an overspeed condition.

The hoistway 14 includes one or more landing floors 34 at which the elevator car 12 stops to allow ingress and/or egress of passengers from the elevator car 12 through elevator car door 38. A landing floor door 36 is located at each landing floor 34 of the hoistway 14. During elevator system operation, the landing floor door 36 opens when the elevator car 12 is present at the landing floor 34 to allow for passenger ingress and/or egress. It is to be appreciated that while singular elevator car door 38 and landing floor door 36 are described herein, the present disclose may be readily applied to elevator cars 12 with multiple elevator car doors 38 and landing floors 34 with multiple landing floor doors 36.

Figure 2:
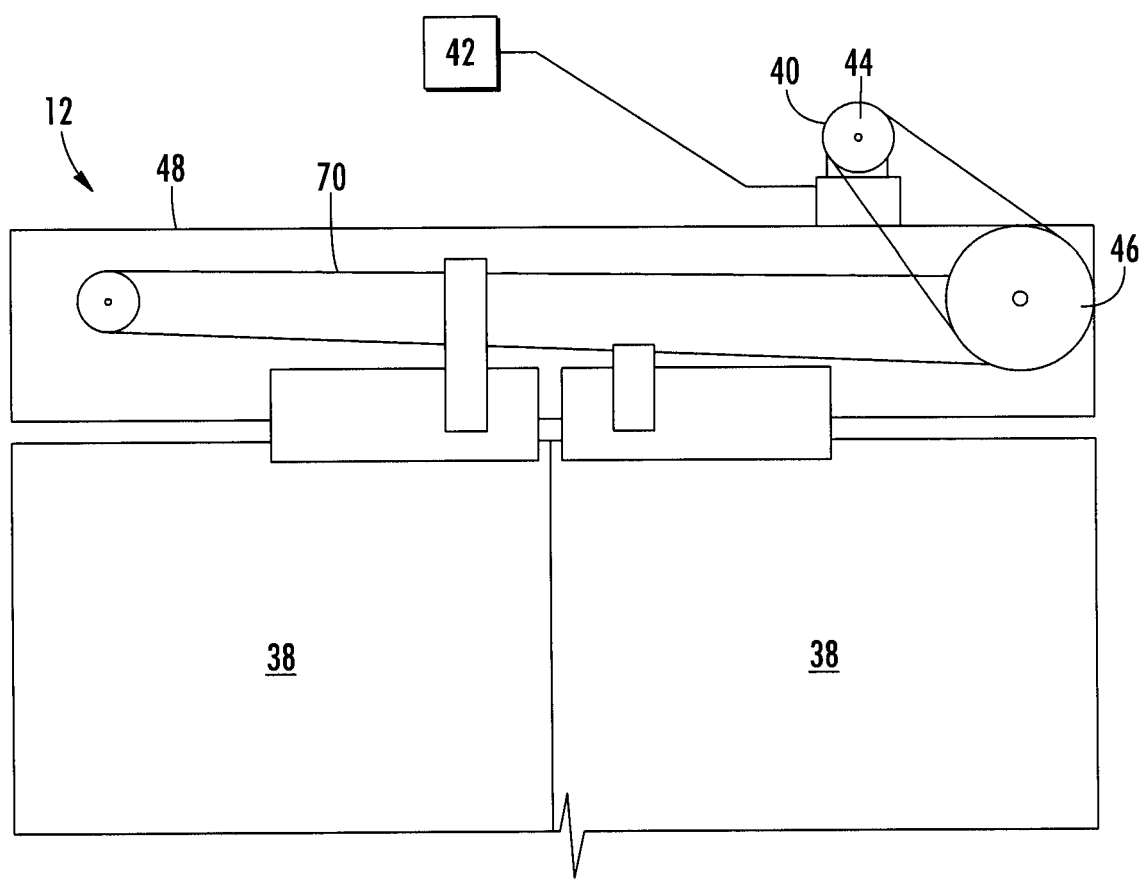
FIG. 2 is a plan view of an embodiment of a door opening motor arrangement for an elevator car.

The elevator car 12 includes a corresponding elevator car door 38 that interacts with the landing floor door 36 to open the elevator car door 38 and the landing floor door 36 at the landing floor 34. Referring to FIG. 2, the elevator car door 38 is connected to an elevator door motor 40, controlled by, for example, an elevator control system 42. As shown, the elevator door motor 40 is an electric motor having a drive axle 44 connected to a drive pulley 46 at the elevator car door 38 by one or more door opening members 70 which may be, for example, chains or belts. Rotation of the drive axle 44 drives rotation of the drive pulley 46 which, in turn, moves the elevator car door 38 between a closed position and an opened position or between an opened position and a closed position. In some embodiments, the elevator door motor 40 is positioned at an upper frame 48 of the elevator car 12, but one skilled in the art will appreciate that the elevator door motor 40 may be located at, for example, a lower frame (not shown) of the elevator car 12, or at another location on the elevator car 12.

Figure 3:
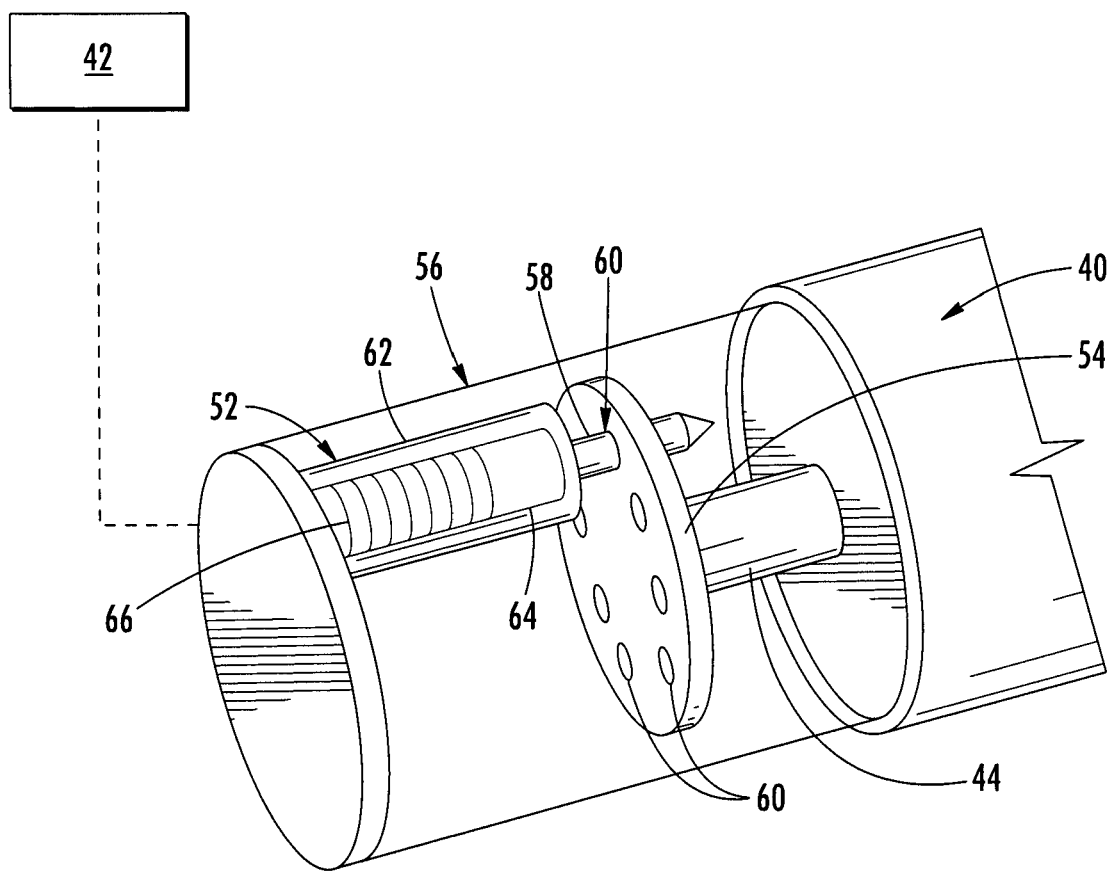
FIG. 3 is a perspective view of an embodiment of a brake assembly for a door opening motor.

Referring now to FIG. 3, a door motor brake 52 is located at the elevator door motor 40 and is operable as a deterrent device to prevent opening of the elevator car door 38 past a selected opening width position when the opening of the elevator car door 38 is not desired, for example, when the elevator car 12 is not positioned at a landing floor 34. The door motor brake 52 is operably connected to the elevator control system 42 and by knowing a position of the elevator car 12 in the hoistway 14, the elevator control system 42 may selectively engage and disengage the door motor brake 52. With the door motor brake 52 engaged, the elevator door motor 40 is disabled and cannot drive the elevator car door 38 to the opened position. This prevents passengers from opening the elevator car door 38.

In some embodiments, the door motor brake 52 is an electromagnetic pin arrangement that prevents rotation of the drive axle 44. A brake disk 54 is fixed to the drive axle 44 and rotates with the drive axle 44 when the elevator door motor 40 is operating. A retractable pin assembly 56 is fixed in proximity to the brake disk 54. The pin assembly 56 includes a brake pin 58 extendable into a brake disk hole 60 in the brake disk 54 to engage the brake pin 58 with the brake disk 54. With the brake pin 58 engaged in the brake disk 54, the brake disk 54, and thus the drive axle 44 is prevented from rotating, thus keeping the elevator car door 38 in the closed position. As shown in FIG. 3, the brake disk 54 includes multiple brake disk holes 60 to increase the likelihood of quick engagement of the brake pin 58 with the brake disk 54.

Although FIG. 3 depicts a brake hole 60, the brake disk 54 may include other features to engage the brake pin 58. For example, the brake disk 54 may include one or more detents on a radial edge of the brake disk 54 (e.g., a ratchet profile). The brake pin 58 would engage the detent on the radial edge of the brake disk 54. Thus, the brake hole 60 is only one example of a brake feature that can engage the brake pin 58.

The brake pin 58 is located in a pin housing 62. An electrical coil 64 is located in the pin housing 62, which in some embodiments at least partially surrounds the brake pin 58. Further, a biasing member, for example, a spring 66 is located in the pin housing 62 to bias the brake pin 58 to an extended position in engagement with the brake disk 54 through the brake feature (e.g., brake holes 60).

Figure 4:
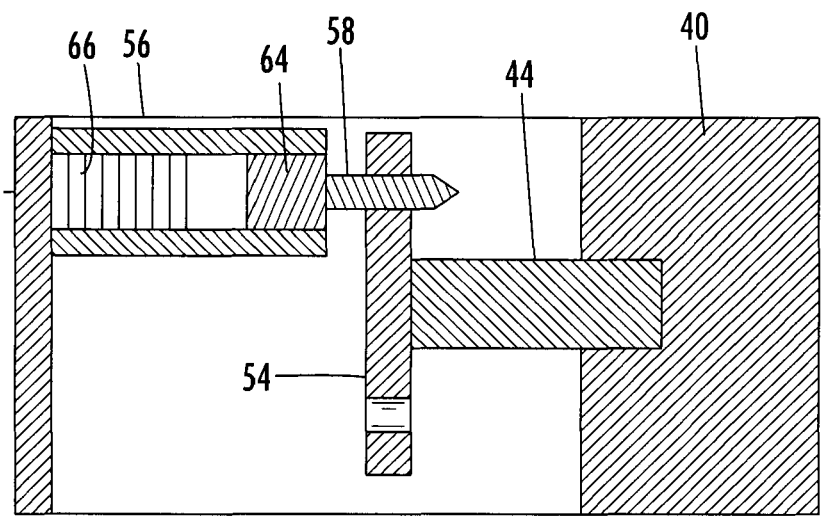
FIG. 4 is a schematic view of operation of an embodiment of a brake assembly for a door opening motor.
Figure 5:
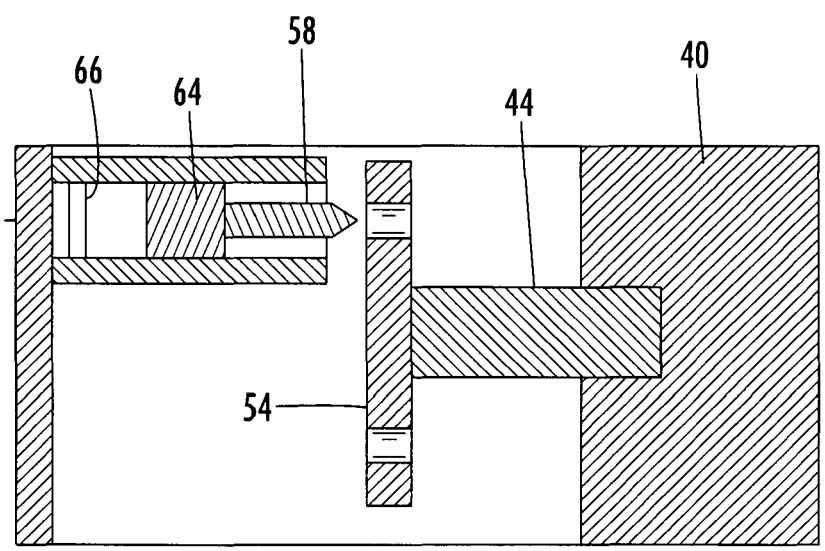
FIG. 5 is another schematic view of operation of an embodiment of a brake assembly for a door opening motor.

Referring now to FIGS. 4 and 5, the pin assembly 46 is operably connected to the elevator control system 42. In FIG. 4, the coil 64 is unpowered, and the brake pin 58 is in the extended position in engagement with the brake disk 54. Thus the elevator car door 38 cannot be opened by the elevator door motor 40. In FIG. 5, the coil 64 is energized by applying an electrical current thereto, resulting in a magnetic field that causes the brake pin 58 to retract into the pin housing 62. The retraction of the brake pin 58 allows the elevator door motor 40 to open the elevator car doors 38.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:
   a hoistway; and
   an elevator car disposed in and drivable along the hoistway, the elevator car including:
      an elevator car door;
      an elevator door motor operably connected to the elevator car door to selectably open and close the elevator car door, the door motor including:
         a drive axle to urge operation of the elevator car door; and
         a braking disk connected to the drive axle, the braking disk including one or more through openings formed therein; and
      a door motor brake disposed at the elevator car door and selectably engageable with the elevator door motor to prevent operation of the elevator door motor thus preventing undesired opening and/or closure of the elevator car door, the door motor brake selectably engageable with the braking disk to prevent operation of the elevator door motor, the door motor brake selectably movable into the one or more through openings to engage with the braking disk;
      wherein the drive axle extends from a first side of the braking disk, and the door motor brake is disposed at a second side of the braking disk opposite the first side.

2. The elevator system of claim 1, wherein the door motor brake is a mechanical stop engageable with the elevator door motor.

3. The elevator system of claim 1, wherein the door motor brake comprises a movable pin selectably engageable with the elevator door motor.

4. The elevator system of claim 3, further comprising an electrical coil disposed at the pin to urge movement of the pin between an extended position in engagement with the elevator door motor and a retracted position out of engagement with the elevator door motor.

5. The elevator system of claim 4, wherein the application of an electrical current to the electrical coil urges the pin toward the retracted position.

6. The elevator system of claim 3, further comprising a biasing member to urge the pin into engagement with the elevator door motor.

7. An elevator car door operating system comprising:
   an elevator door motor operably connectable to an elevator car door to selectably open and close the elevator car door, the elevator door motor including:
      a drive axle to urge operation of the elevator car door; and
      a braking disk connected to the drive axle, the braking disk including one or more through openings formed therein; and
   a door motor brake disposed at the elevator car door and selectably engageable with the elevator door motor to prevent operation of the elevator door motor thus preventing undesired opening and/or closure of the elevator car door, the door motor brake selectably engageable with the braking disk to prevent operation of the elevator door motor, the door motor brake selectably movable into the one or more through openings to engage with the braking disk;
   wherein the drive axle extends from a first side of the braking disk, and the door motor brake is disposed at a second side of the braking disk opposite the first side.

8. The elevator car door operating system of claim 7, wherein the door motor brake is a mechanical stop engageable with the elevator door motor.

9. The elevator car door operating system of claim 7, wherein the door motor brake comprises a movable pin selectably engageable with the elevator door motor.

10. The elevator car door operating system of claim 9, further comprising an electrical coil disposed at the pin to urge movement of the pin between an extended position in engagement with the elevator door motor and a retracted position out of engagement with the elevator door motor.

11. The elevator car door operating system of claim 10, wherein the application of an electrical current to the electrical coil urges the pin toward the retracted position.

12. The elevator car door operating system of claim 9, further comprising a biasing member to urge the pin into engagement with the elevator door motor.

* * * * *